United States Patent [19]

Bowen

[11] Patent Number: 4,480,807
[45] Date of Patent: Nov. 6, 1984

[54] WING CHUTE DEPLOYMENT SYSTEM

[76] Inventor: Arthur D. Bowen, 509 E. Vogel St. #3, Phoenix, Ariz. 85020

[21] Appl. No.: 417,175

[22] Filed: Sep. 13, 1982

[51] Int. Cl.³ .................. B64D 17/62; B64D 17/80
[52] U.S. Cl. .............................. 244/139; 244/147; 312/272; 312/23
[58] Field of Search ................ 244/138 R, 139, 140, 244/141, 147, 148, 149, 137 R; 312/22, 23, 272, 272.5, 130, 312; 220/93; 206/45.13, 45.16; 49/366, 70; 258/23; 89/1.801, 1.802, 1.815, 1.817

[56] References Cited

U.S. PATENT DOCUMENTS

| | | |
|---|---|---|
| 428,345 | 5/1890 | Melville .................. 312/272.5 |
| 1,192,480 | 7/1916 | Van Meter, Jr. . |
| 1,823,758 | 9/1931 | Owens . |
| 1,970,812 | 8/1934 | Myers .................... 244/139 |
| 2,324,045 | 7/1943 | Vallinos .................. 244/139 |
| 2,698,083 | 12/1954 | Palson ................... 206/45.13 |
| 3,092,358 | 6/1963 | Potts, Jr. et al. ........ 244/147 |
| 3,107,887 | 10/1963 | Dixon et al. ............ 244/139 |
| 3,315,920 | 4/1967 | Caughron ............... 244/139 |
| 3,395,881 | 8/1968 | Markham et al. ....... 244/139 |
| 3,833,192 | 9/1974 | Vitack et al. ........... 244/139 |
| 4,108,402 | 8/1978 | Bowen .................... 244/147 |

FOREIGN PATENT DOCUMENTS

| | | |
|---|---|---|
| 455452 | 2/1928 | Fed. Rep. of Germany ... 312/272.5 |
| 423614 | 12/1910 | France . |
| 1118938 | 6/1956 | France ................... 312/272.5 |

Primary Examiner—Galen L. Barefoot
Attorney, Agent, or Firm—Sutton & Thomas Cahill

[57] ABSTRACT

A wing contained emergency descent system incorporates a plurality of bays positioned within the wing structure of an aircraft. Each bay opens upwardly and outwardly of the wing through the upper surface thereof and supports a tray positioned within the bay. The tray contains one or more parachute packs and is positioned to be elevatable through the actuation of a pair of doors. The doors form a part of the upper skin of the aircraft wing and each includes an operating arm depending therefrom. The operating arm engages the tray such that the arm elevates the tray, and parachute pack thereon, into the air stream flowing over the wing when the panel or doors are opened.

6 Claims, 8 Drawing Figures

WING CHUTE DEPLOYMENT SYSTEM

BACKGROUND OF THE INVENTION

1. Field of the Invention

The present invention pertains to aircraft emergency systems, and more particularly, to a system for deploying a plurality of chutes from aircraft wings in the event of an emergency.

2. Description of the Prior Art

The utilization of descent arresting techniques for increasing the survivability of an aircraft crash is well known in the art. For example, U.S. Pat. No. 4,108,402, issued to the present inventor, describes a system for deploying a parachute from a fuselage of an aircraft in the event of an emergency descent. Other prior art systems incorporating parachutes have been described; however, when applying such techniques to larger aircraft, the difficulty appears to be obtaining sufficient parachute area or volume to sufficiently arrest the descent.

The deployment of a sufficient number of parachutes from the fuselage of an aircraft or the deployment of a parachute of sufficient size from an aircraft are impractical. It is important to recognize that the deployment of a plurality of chutes from an aircraft is intended solely to increase the survivability of the resulting crash and is unlikely to contribute significantly to the saving of the aircraft structure. The deployment of as many chutes as required to sufficiently arrest the vertical speed of the aircraft therefore becomes important; the utilization of the main wing structure of the aircraft presents a significant area from which chutes can be deployed and from their points of deployment can also be used under some circumstances as emergency deceleration systems.

OBJECTS OF THE INVENTION

It is therefore an object of the present invention to provide an aircraft emergency descent system incorporating a plurality of parachutes operating from the main wing of the aircraft.

It is another object of the present invention to provide an aircraft emergency descent system incorporating deployable chutes mounted internally of the wing structure that can automatically be elevated into the air flow over the wing to facilitate chute deployment.

It is still another object of the present invention to provide an aircraft emergency descent system incorporating a plurality of chutes positioned within an aircraft wing deployable in a predetermined manner in accordance with a programmed control system.

It is still another object of the present invention to provide an aircraft emergency descent system incorporating parachutes mounted internally of the wing structure in a manner such that the parachute pack is elevated through an opening provided therefor in the upper wing skin to facilitate rapid deployment of the chute.

These and other advantages of the present invention will become apparent to those skilled in the art as the description thereof proceeds.

SUMMARY OF THE INVENTION

In accordance with the embodiment chosen for illustration, a plurality of parachute packs are mounted internally of an aircraft wing structure each positioned on a tray secured within a bay in the wing. Each of the bays is enclosed by the upper skin of the aircraft wing formed into a pair of hinged doors. Each of the doors incorporates a depending arm that engages opposite sides of the parachute tray. The doors are openable through the energization of actuators such as electrical motors; as the doors open, the depending arms raise the tray and expose the parachute to the air flow passing over the opening to ensure the chute's deployment and prevent fouling of the chute. Under certain circumstances, to be described more fully hereinafter, the elevation of the tray to permit the chutes to deploy without fouling within the wing provides the added advantage of the availability of such chutes as "drag chutes".

BRIEF DESCRIPTION OF THE DRAWINGS

The present invention may more readily be described by reference to the accompanying drawings in which.

DETAILED DESCRIPTION OF THE PREFERRED EMBODIMENT

Figure 1:
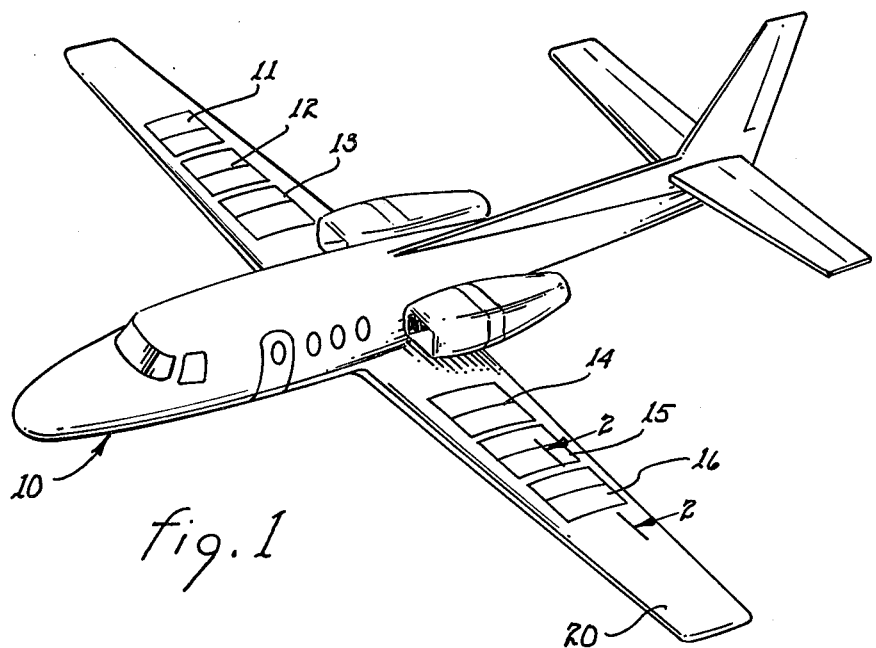
FIG. 1 is a perspective view of a business jet type aircraft incorporating the aircraft emergency descent system of the present invention.
Figure 2:
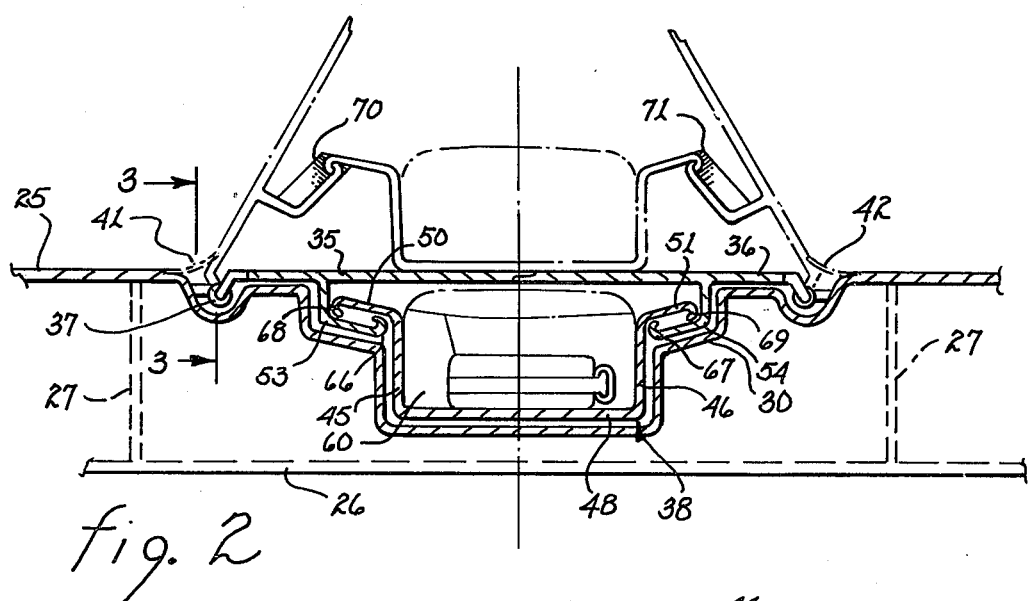
FIG. 2 is a cross-sectional view of a portion of the aircraft of FIG. 1 taken along line 2—2.

Referring now to FIG. 1, a typical business jet aircraft 10 is shown incorporating the system of the present invention. In the embodiment chosen as an illustration, the wing 20 of the aircraft 10 includes pairs of doors or panels 11-16 each pair of which encloses a compartment containing an emergency chute. The compartment may be seen by reference to FIG. 2 wherein the upper surface or skin 25 of the wing is separated from the lower skin or surface 26 by suitable bulkheads such as those shown at 27 to form the compartment 28. Since it is common for such compartments to be utilized to contain fuel, only a portion of compartment 28 need be utilized by the system of the present invention. In the embodiment chosen for illustration, the aluminum or other metal utilized to form the upper skin 25 of the particular section of the wing overlying the bay 28 may be formed into a shape such as that shown at 30 to provide a bay 31 extending into but separated from the compartment 28.

The bay 31 is enclosed through the utilization of a pair of emergency doors 35 and 36. The doors 35 and 36 are hinged as shown at 37 and 38 respectively and are movable from their enclosing positions shown in solid lines in FIG. 2 to an opened position as shown by the broken lines in FIG. 2. When the emergency doors are closed, the upper portion of the wing conforms to its original design shape; further, the gaps formed in the upper skin 25 of the wing by the inclusion of hinges 37 and 38 may be sealed as shown at 41 and 42 through the use of a thin aluminum deformable strip that may be secured by bonding or riveting to the upper skin 25 of the wing. In this manner, no aerodynamic penalty results from the inclusion of the hinged emergency doors in the top of the wing. Further, since the strips 41 and 42 are readily deformable, the doors may be opened without the requirement of undue force.

A tray 38 is mounted within the bay 31 and includes sides 45 and 46 as well as a bottom 48 and an open top. Each of the sides 46 and 47 includes a flange 50 and 51 respectively extending therefrom to form a means for engagement with depending arms 53 and 54 extending from the emergency doors 35 and 36 respectively. One or more parachute packs such as chute pack 60 is mounted on the tray 38 and is secured thereto in any convenient manner. The parachute or parachutes contained within the pack 60 may be anchored to the tray 38, the member 30, or to any convenient structural member within the wing.

The emergency doors 35 and 36 may be opened through the utilization of any convenient opening means such as an electric motor 65 to permit the controlled opening of the doors 35 and 36. As the doors are opened, the respective arms 53 and 54 contact the flanges 50 and 51 to raise the tray 38 upwardly to ensure that the air stream flowing over the upper portion of the wing contacts the chute pack and appropriately deploys the chute contained therein. It may not be necessary to completely raise the chute pack to the extent shown in FIG. 2; for example, it may be found sufficient to merely raise the chute pack a predetermined distance into the air stream without elevating the tray entirely above the upper wing surface.

Figure 5:
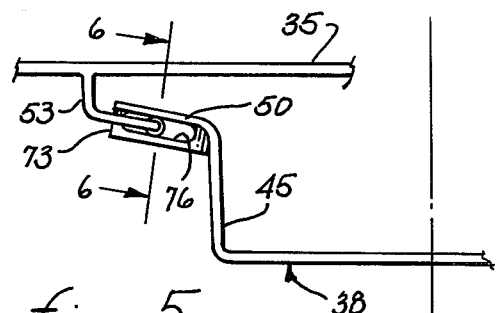
FIG. 5 is an end view of an alternative coupling means for securing the depending arm of each of the system doors to the tray.
Figure 6:
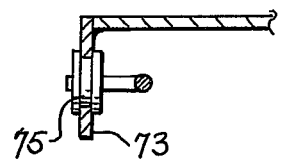
FIG. 6 is a cross-sectional view of FIG. 5 taken along line 6—6.
Figure 7:
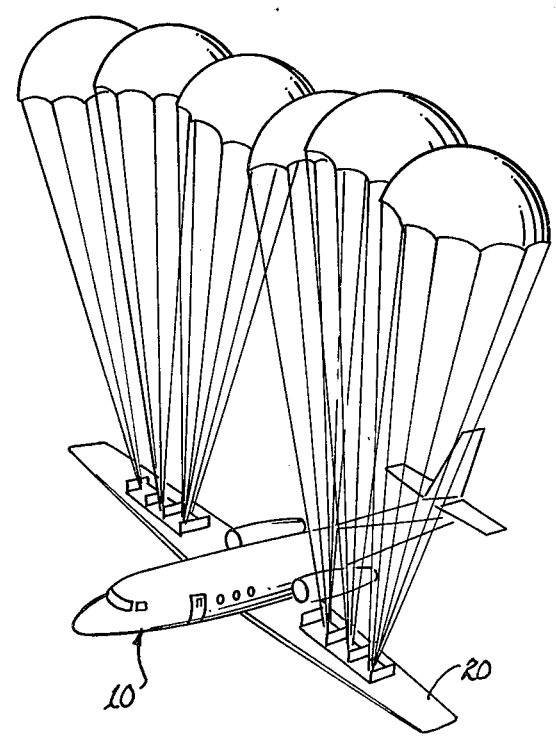
FIG. 7 is a schematic representation of the aircraft of FIG. 1 having the emergency descent system deployed.

The operating or actuating arms 53 and 54 depending from the doors 35 and 36 respectively may be seen to include hooked ends 66 and 67 respectively. These hooked ends engage corresponding hooked ends 68 and 69 on the flanges 50 and 51. The interconnected hooked ends prevent the continued upward movement of the tray 38 when the tray is in its fully extended position. End plates 70 and 71 are provided to prevent movement of the tray 38 in the direction of the air flow when the tray extends from the wing surface. A more positive coupling between the actuating arms 53 and 54 and the tray 38 may be achieved through the utilization of the modified coupling design shown in FIGS. 5 and 6. It may be seen by reference to the latter figures that the tray 38 incorporates a sidewall 45 having a flange 50 secured to a slotted track member 73. The actuating arm 53 is provided with a journaled roller 75 positioned to track in the slot 76. In this manner, a more positive control movement is provided to the upward moving tray when the emergency door 35 is opened.

Figure 3:
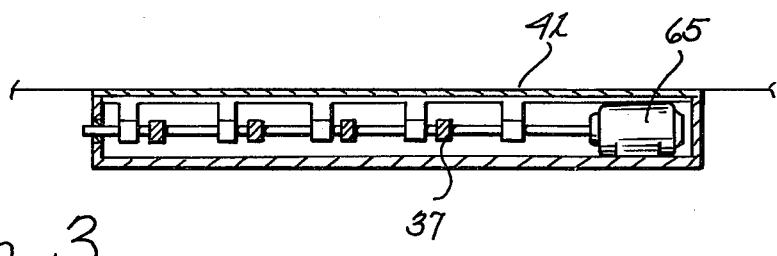
FIG. 3 is a cross-sectional view of a portion of FIG. 2 taken along line 3—3.
Figure 4:
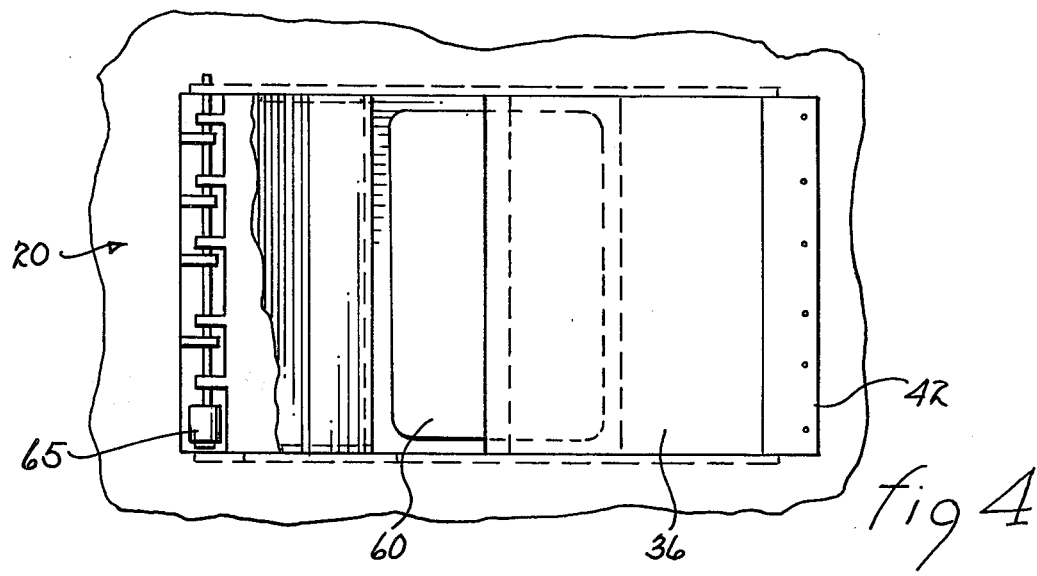
FIG. 4 is a top view, partially cut away, of a portion of the wing of the aircraft of FIG. 1.
Figure 8:
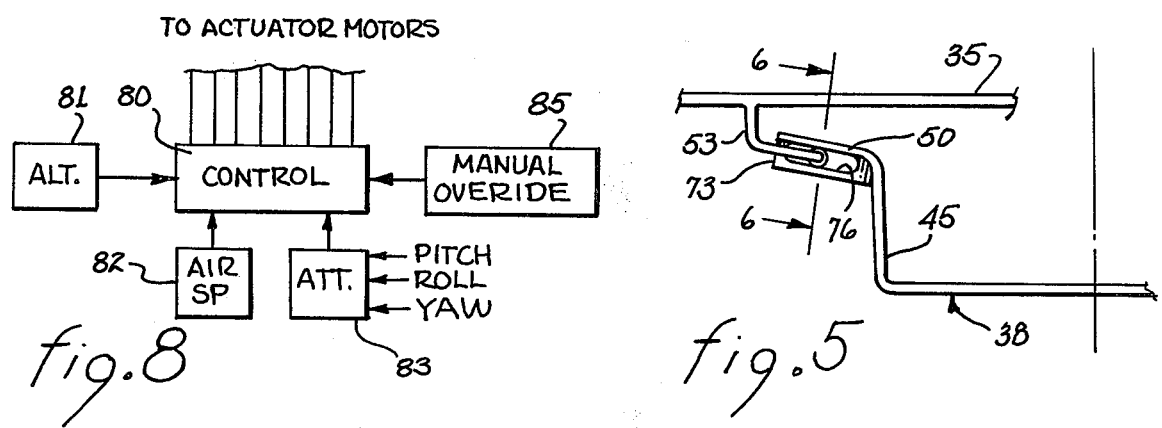
FIG. 8 is a schematic block diagram of a suitable control system for incorporation in an aircraft utilizing the emergency descent system of the present invention.

Keeping in mind the fact that the present emergency descent system is intended to increase the survivability of an aircraft crash, and is not concerned with the aircraft's structure per se, it may be noted that the survivability of a crash is directly related to the speed of the aircraft on impact. Deployment of chutes may so disrupt the air flow past the air foil surfaces of the aircraft that a stall will ensue causing complete loss of aircraft control and resulting in a crash of no less severity than without the parachutes. It is therefore important that the deployment of the parachutes be controlled such that the chutes are deployed at or as close to the aircraft stall speed as possible and that the lift provided by the chutes be as nearly balanced about the aircraft's center of gravity as possible. It may therefore be desirable to position the respective chutes in the system of the present invention with regard to the air flow over the wing as well as the center of lift to be provided by the deployed parachutes. In some instances it may be possible to slow the aircraft to its initial stall speed and thereafter sequentially release the successive parachutes as the aircraft wing progressively stalls in a typical manner from near the fuselage to the wing tips. The sequential or controlled deployment of the wing chutes can be accomplished through the utilization of well known onboard micro-processor techniques. Referring to FIG. 8, a typical control system for the deployment of the respective chutes is shown. A central control system 80 is shown that may take the form of a conventional micro-processor connected to receive appropriate input signals from an altimeter 81, an air speed monitor 82, and an attitude monitor 83 which in turn receives appropriate pitch, roll and yaw input signals. If the air speed is within a safe limit (reasonably close to stall) the control unit may permit deployment of the emergency parachutes. The deployment could then take place only if a suitable aircraft attitude were present; that is, if the aircraft were in a bank or a climbing turn the deployment of the parachutes may result in non-uniform arresting forces and result in a situation more dangerous than allowable. Thus, the control system of FIG. 8 may be utilized to monitor the deployment and energize the respective door motors such as that shown at 65 and FIG. 3. A manual over-ride 85 may be provided to permit the deployment of the chute notwithstanding the inputs to the control system from the respective monitoring circuits. For example, in long landing situations such as icy runways or defective hydraulic systems resulting in brake loss, the deployment of the chutes from the aircraft wings may be achieved through the actuation of the manual over-ride 85 at the point of touchdown. Since the individual trays containing the chutes are elevated into the air stream, the chutes will be deployed even though the aircraft may actually be on the ground. The chutes will then act in much the same manner as a conventional "drag chute" to significantly slow the aircraft after touchdown.

I claim:

1. An aircraft emergency descent system, for use in an aircraft having wings with upper and lower surfaces defining a space therebetween, comprising:
   a. a tray positioned in said space for supporting a parachute pack;
   b. a pair of emergency doors each having an upper surface formed from the upper surface of a wing, each of said doors including an operating arm depending therefrom;
   c. each of said operating arms connected to said tray for lifting, as said emergency doors are opened, said tray toward an air stream passing over said wing.

2. The combination set forth in claim 1 wherein said tray incorporates opposing sides each having a flange extending therealong, and wherein said operating arms each contact a respective one of said flanges for raising said tray as said emergency doors are opened.

3. The combination set forth in claim 1 including means secured to said emergency doors for opening said doors.

4. The combination set forth in claim 1 including means defining a bay extending into said space to separate said tray and parachute pack from the remainder of the space within said aircraft wing.

5. An aircraft emergency descent system, for use in an aircraft having wings with upper and lower surfaces defining a space therebetween, comprising:
   a. a plurality of parachutes disposed in individual compartments spaced along the wings of said aircraft, each parachute pack mounted on a tray having two sides, a bottom and an open top positioned in said space;
   b. a plurality of pairs of hinged emergency doors each door having an upper surface formed from the upper surface of said wing; each door including an operating arm depending therefrom;
   c. each tray positioned in contact with the operating arms of a corresponding pair of hinged emergency doors to thereby raise the tray into the air stream when the corresponding pair of emergency doors are opened; and
   d. actuatable opening means connected to said hinged emergency doors for opening said doors.

6. The combination set forth in claim 5 wherein said actuatable opening means comprises electric motors connected to the respective hinged emergency doors.

* * * * *